Jan. 19, 1937.  L. A. BURTON  2,068,625
SHAPING DEVICE
Filed April 9, 1935    2 Sheets—Sheet 1
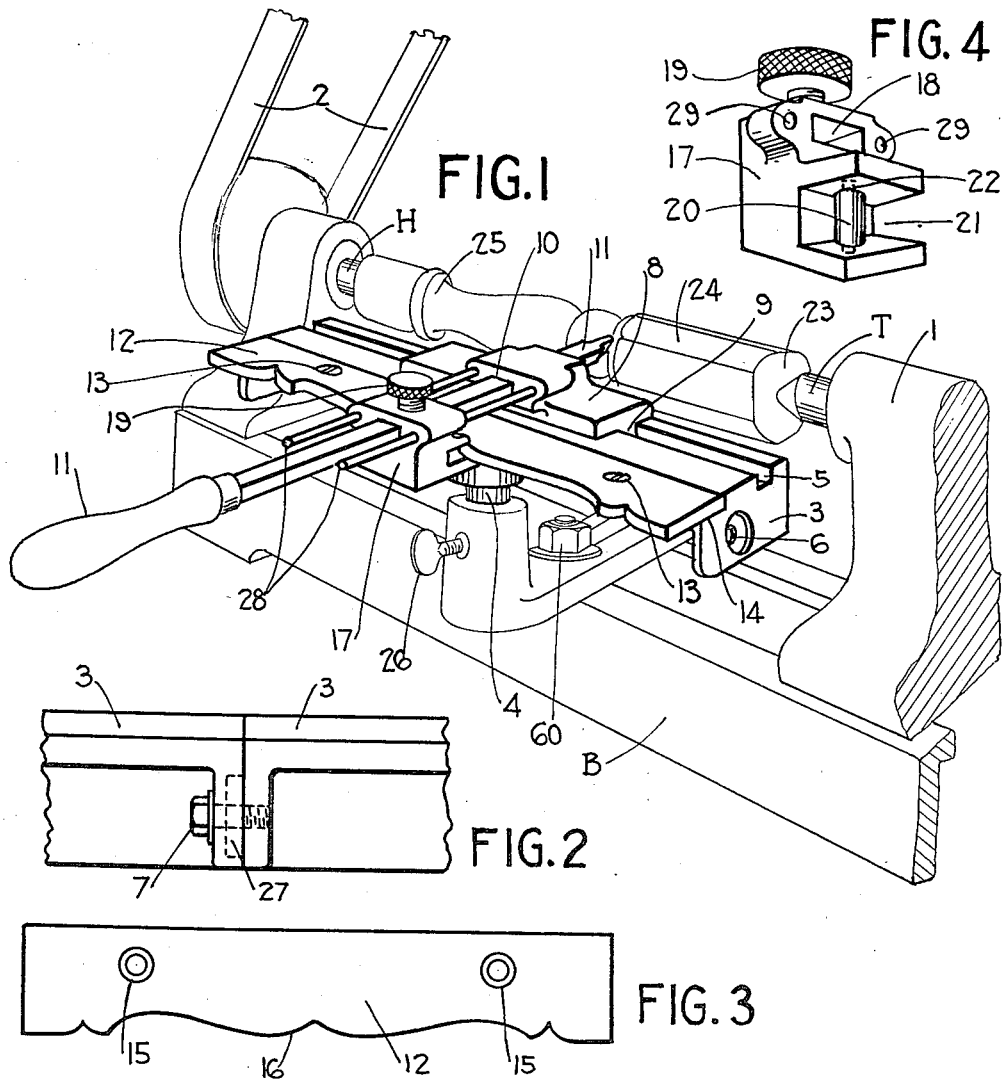
INVENTOR
LESTER A. BURTON
BY B. F. Stoddard
ATTORNEY.

Jan. 19, 1937. L. A. BURTON 2,068,625
SHAPING DEVICE
Filed April 9, 1935 2 Sheets-Sheet 2

INVENTOR
LESTER A. BURTON
BY B. F. Stoddard.
ATTORNEY.

Patented Jan. 19, 1937

2,068,625

UNITED STATES PATENT OFFICE 2,068,625

SHAPING DEVICE

Lester A. Burton, Fanwood, N. J., assignor to Robert B. Ogden, Cranford, N. J.

Application April 9, 1935, Serial No. 15,372

3 Claims. (Cl. 142—38)

This invention relates to a shaping device for use in conjunction with a lathe and, more particularly, to a device and method for facilitating the making of a plurality of uniform, or duplicate turnings with the use of a lathe.

It is an object of this invention to provide a lathe with an improved attachment for facilitating the making of a plurality of duplicate turnings.

Another object of this invention is to provide a lathe with a plurality of unit tool rests which may be combined to correspond with the length of a particular turning.

Another object of this invention is to provide a lathe with an improved device for holding a chisel and for gauging the cutting depth of the chisel in accordance with a predetermined plan.

Still another object of this invention is to simplify the art of wood shaping for both the novice and one skilled in the art.

These and other objects of the invention are attained by equipping a turning lathe with a profile attachment. The profile attachment comprises a special tool rest, or supporting member, having a groove, or slot, therein. For shaping turnings of considerable length, two or more of these special tool rests may be employed. They can be joined securely together by any convenient means, such as a thumb screw. Also, they can be supplied with a guiding instrumentality for aligning them.

The slot in the tool rest is for receiving the tongue of a stirrup and for guiding the movement of the stirrup. This stirrup has an opening, or hole, therein for slidably holding a cutting instrumentality, such as a chisel. In the preferred embodiment of the invention, the stirrup is provided with two rods on which a gauge member is slidably mounted.

Secured to the tool rest by holding means, such as a screw or screws, is a templet of any desired material, preferably wood. In its desired form, the templet is a flat plate having one edge shaped in a predetermined outline to correspond with the profile of the desired turning. The gauge member which is slidably mounted upon the rods attached to the stirrup is also slidably mounted along the shaped edge of the templet. This gauge member has an orifice, or aperture, therein for receiving a cutting member, such as a chisel. This gauge member has an instrumentality, such as a locking thumb nut or set-screw, for securely and firmly holding the chisel. The gauge member also comprises another instrumentality, such as a roller, rotatably secured thereto for enabling the gauge member to follow the outline of the templet whereby the cutting depth of the chisel is accurately and uniformly gauged for a plurality of duplicate turnings.

These and other features of the invention will be more fully described in connection with the following detailed description of the drawings illustrating a preferred embodiment of the invention in which:

Fig. 1 is a perspective view illustrating the invention and its method of operation;

Fig. 2 shows the manner in which two tool rests, or supporting members, may be joined securely together;

Fig. 3 is a top plan view of a typical templet;

Fig. 4 is a three dimensional view of the gauge member;

Fig. 5 represents one form of a cutting instrumentality or chisel adapted for use with templets having mild curves in their outlines;

Fig. 6 shows another type of cutting member suitable for use with templets having sharp and deep curves in their outlines;

Figure 7:
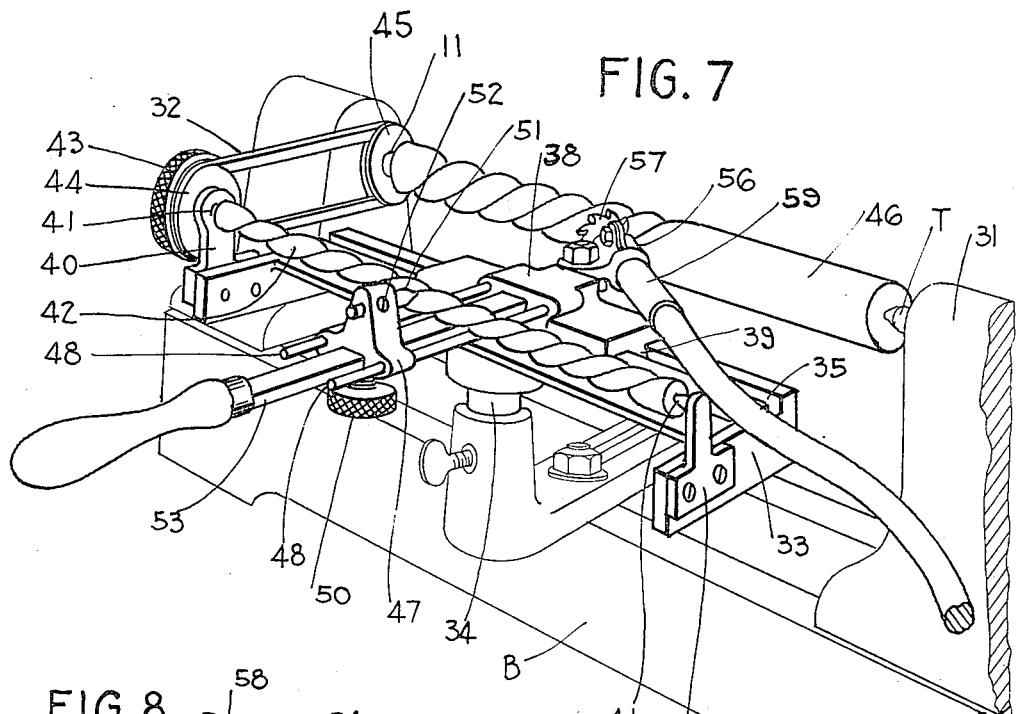
Fig. 7 illustrates a modification of the invention adapted for use with a toothed rotatable cutter instead of a chisel.

In Fig. 1, a turning lathe 1, mounted on a bed B and having a head stock H and a tail stock T, is shown to be driven by an endless belt 2. Mounted on the bed B, in place of the standard tool rest usually employed, is a special tool rest 3, or supporting member, securely mounted on a pillar 4. Pillar 4 is adjustable in a vertical direction by means of thumb screw 26 to accommodate the size of the lathe on which it is to be used. It is also adjustable laterally by means of lock nut 60 for aligning it with the longitudinal axis of the lathe. This special tool rest 3, or supporting member, has a hole 6 and an aligning construction 27 in each end and a groove 5 in its top surface for purposes to be hereinafter explained.

When shaping turnings of considerable length, a unit tool rest 3 may be moved along as the turning proceeds or an extra long tool rest may be used. If this is undesirably cumbersome, two or more unit tool rests 3—3 may be joined to form a tool rest of infinite length. These units 3—3 may be joined securely together, as shown in Fig. 2, by an instrumentality, such as a thumb screw 7. It is to be understood, of course, that any other convenient joining means, such as a clamp, may be used instead if desired and that the use of threaded holes 6—6 and screw 7 is shown purely for purposes of illustration. In the preferred embodiment of the invention, a male and female guiding form 27 is utilized to properly align the units 3—3.

Resting on the top of the supporting member 3 is a stirrup 8 having a tongue 9 on its bottom surface adapted to slide in the slot 5. Slot 5 serves to guide and limit lateral movement of the stirrup 8 to a predetermined path perpendicular to the axis of lathe 1. However, stirrup 8 may be lifted up vertically for quick removal when desired. This stirrup 8 has an opening 10, or hole, therein, the axis of which is preferably perpendicular to groove 5. Opening 10 is provided for the purpose of receiving and slidably holding a cutting instrumentality 11, such as a chisel, in such a manner that chisel 11 is free to move to and from the longitudinal axis of the lathe 1 by sliding in and out of hole 10. Chisel 11 may be moved laterally by sliding stirrup 8 along groove 5 so that, in effect, lateral movement of chisel 11 is controlled by groove 5. In the preferred form of the invention, stirrup 8 is provided with instrumentalities, such as rods 28—28 for a purpose to be explained hereinafter.

The tool rest 3 has a supporting ledge 14 to which a templet 12 is firmly secured by any convenient holding means, such as screws 13—13. This templet 12 is a flat plate, preferably of wood, having one edge 16 shaped in a predetermined outline to correspond with the profile of the desired turning. The templet 12 should have a length approximately equal to the length of the desired turning. The width of a templet is of no particular importance except that it should preferably be sufficiently wide to project beyond the edge of ledge 14 of tool rest 3.

A top plan view of a typical templet 12 is shown in Fig. 3 wherein it can be seen that templet 12 has holes 15—15 for receiving screws 13—13. Holes 15—15 are so positioned as to insure that a straight edge of templet 12 will be parallel to the center of the pattern of the desired turning. It is to be understood that the predetermined outline of templet 12, shown in Fig. 1 and Fig. 3, is given merely for purposes of illustration and that templets having other combinations of curves in their outlines may be used if desired. Templet 12 may be readily removed and a templet having a different outline may be substituted by removing screws 13—13, lifting up and removing templet 12, placing the other templet on ledge 14, and then replacing screws 13—13.

Slidably mounted along the shaped edge 16 of templet 12 is gauge member 17 having an orifice 18 (Fig. 4) therein for receiving a cutting member 11, such as a chisel. This gauge member 17 has a holding instrumentality 19, such as a locking thumb nut, for securely and firmly holding a chisel 11 inserted in the orifice 18 up to any desired depth. The use of a thumb nut 19 is shown merely as one example of a holding means. Any other suitable holding means, such as a set-screw, could be used if desired. As is shown in Fig. 1, the gauge member 17 has extensions for embracing the templet 12. These extensions serve to prevent unintentional downward movement of the chisel point by any cause, such as by the rotating turning 23.

Gauge member 17 is provided with two holes 29—29 for enabling it to be slidably mounted upon rods 28—28 fixedly attached to stirrup 8. This furnishes gauge member 17 with a means of support and guidance independent of that occasioned by the connection of stirrup 8 and gauge member 17 with chisel 11. As can be seen in Fig. 1, rods 28—28 serve to prevent lateral displacement of the chisel in respect to the templet and also serve to prevent binding of the chisel 11 in opening 10 of the stirrup 8. The gauge member 17 and its orifice 18 may be more clearly seen in Fig. 4 in which it can be seen that member 17 also comprises another instrumentality 20, such as a roller or rotatable sleeve. The diameter of roller 20 should preferably be equal to twice the radius of the rounded end of chisel 11. Roller 20 is located in a recess 21 in member 17 and is rotatably secured to member 17 by being rotatably mounted on a pin 22. This construction is shown for illustrative reasons. If desired, a non-rotatable instrumentality, such as a knife-edge, could be used instead of roller 20. However, roller 20 is the preferred instrumentality because it considerably reduces the frictional effect of the contact of member 17 with edge 16 of templet 12.

The preferred form of cutting instrumentality 11 suitable for use with the invention is a chisel, such as the chisel 11 shown in Fig. 1. However, when templets having very small and numerous or large and widely spaced curves are used, efficient operation makes it desirable to use chisels having different types of cutting edges. It is also desirable to use one type of chisel for preliminary shaping, or roughing, of the turning and another type for finishing, or semi-finishing, the turning. Accordingly, Fig. 5 shows a chisel 11′ having a cutting edge suitable for shaping gradual curves or roughing. Fig. 6 illustrates a chisel 11″ having a cutting edge suitable for shaping deep curves or semi-finishing. Experimentation has shown that chisels 11′ and 11″ will suffice for ordinary turnings. For turnings of peculiar profiles, other types of chisels may be used. However, it is preferable that the chisel blades be of uniform width and thickness throughout their lengths in order to simplify the form and construction of gauge member 17 and stirrup 8.

Having described the preferred embodiment of the invention, the preferred method of operation for readily obtaining duplicate turnings will now be described. First, the material 23, from which a particular turning is to be made, is mounted in lathe 1 in the usual manner. The material 23 is then roughly turned to an approximately cylindrical shape. Either an ordinary tool rest or the special tool rest 3 may be used for this preliminary shaping process. Likewise, either an ordinary roughening gauge or chisel 11′ may be used for this preliminary work.

After the material 23 has been shaped to an approximate cylinder, as shown at 24, the special tool rest 3 is mounted on pillar 4 and secured thereto and vertically adjusted so as to be on a plane commensurate with the size of lathe 1. It is also necessary to laterally adjust tool rest 3 in order that its axis will be aligned with, or parallel to, the longitudinal axis of lathe 1. This lateral adjustment may be expeditiously accomplished either by measurement or by inserting a piece of wood, of uniform thickness, between the inner edge of tool rest 3 and the material 23. When tool rest 3 is pushed against this piece of wood so that the sides of the piece of wood are in simultaneous contact with both the tool rest 3 and the turning 23, this lateral adjustment will be correct.

The next step is to attach the desired templet 12 to the ledge 14 of supporting member 3 by means of screws 13—13. Stirrup 8 is then placed on top of supporting member 3 with tongue 9 inserted in slot 5. After this, gauge member 17 is mounted on the shaped edge 16 of templet 12. A chisel, such as chisel 11', is then slid through orifice 18 in gauge member 17 through hole 10 in stirrup 8. Chisel 11' is so positioned as to cut to a depth of about $\frac{1}{16}''$ on turning 23. Thumb nut 19 is then tightened thereby rigidly clamping chisel 11' at this point.

Stirrup 8 is now moved slowly from one end of the tool rest 3 to the other end. This motion of stirrup 8 is transmitted by chisel 11' to gauge member 17 with the result that the gauge member 17 is slid along the shaped edge 16 of templet 12. Gauge member 17, in following the outline of templet 12, automatically gauges the cutting depth of chisel 11'' by causing chisel 11' to be slid in and out of opening 18 in stirrup 8. In other words, chisel 11' is automatically moved toward and from turning 23 thereby cutting away portions of the revolving turning 23 in accordance with the outline 16, or profile, of templet 12. Consequently, the profile of the shaped turning 25 will correspond with the profile 16, or outline, of templet 12.

Thumb nut 19 is now loosened, and chisel 11' is moved onward another $\frac{1}{16}''$. Thumb nut 19 is then tightened and stirrup 8 is again moved slowly from one end of tool rest 3 to the other. This procedure is repeated until the shaped turning 25 is of the desired diameter. The fidelity of reproduction of the profile of templet 12 may be carried to a finer degree by substituting chisel 11'' for chisel 11'. This substitution should preferably be done when the shaped turning 25 has been cut down to about $\frac{1}{16}''$ of its desired diameter. If desired, a chisel with a still smaller formed cutting end than chisel 11'' may be used.

Figure 8:
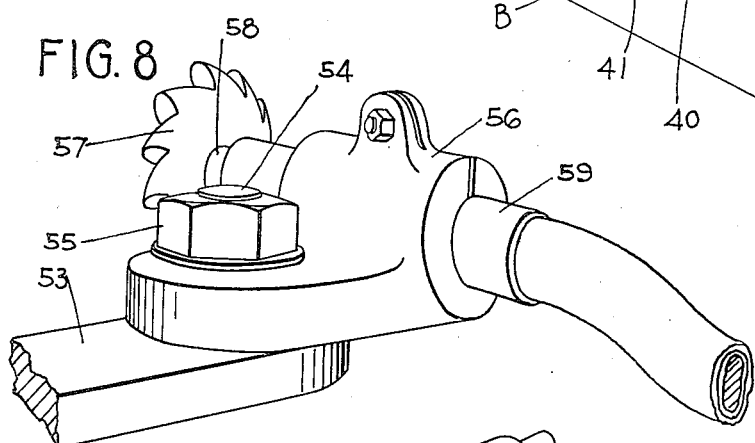
Fig. 8 shows the manner in which the toothed rotatable cutter is mounted in a modified stirrup.
Figure 9:
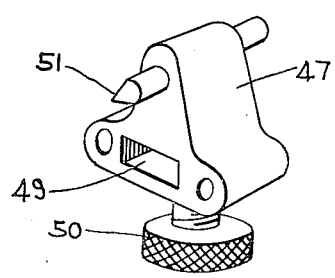
Fig. 9 represents the modified gauge member employed in this form of the invention.

A modification of the invention adapted for shaping twist turnings is illustrated in Figs. 7, 8, and 9. In Fig. 7, a turning lathe 31, having a head stock H and a tail stock T, is mounted on a bed B. Mounted on the pillar 34 is a special tool rest having a groove 35 in its top surface. Resting on top of the tool rest 33, is a stirrup 38 having on its bottom surface a tongue 39 adapted to slide in slot 35.

A pair of brackets 40—40 are secured to opposite ends of tool rest 33 as shown in the drawings. Mounted on brackets 40—40 are supporting centers 41—41 for rotatably supporting a cylindrical twist templet 42. Although templet 42 is shown to be in the form of a spiral, it is to be understood that this is purely for purposes of illustration and that any other desired shape may be used.

One of the supporting centers 41—41, preferably the left one, is lengthened in order that an instrumentality, such as a hand wheel 43, having a pulley wheel 44 secured thereto, may be mounted on it. Belt 32 is passed around pulley wheel 44 and also around a pulley wheel 45 mounted on lathe 31. Thus, by means of this indexing device, the turning 46 on lathe 31 will be rotated synchronously with templet 42. If desired, a gear arrangement could be substituted in place of belt 32 and pulley wheels 44 and 45.

A gauge member 47 is slidably mounted on rods 48 fixedly attached to stirrup 38. Gauge member 47 is shown in detail in Fig. 9 in which it can be seen that gauge member 47 has a hole 49, or opening therein. A thumb screw 50 passes up through the bottom of gauge member 47 into the hole 49. A finger 51 is adjustably mounted in gauge member 47 and is fixedly held in position by any convenient means, such as set-screw 52.

A supporting bar 53 passes through hole 49 and also through a hole in stirrup 38. Bar 53 is slidably retained by stirrup 38 but is fixedly held in gauge member 47 by means of thumb screw 50. Secured to the end of bar 53 by any convenient means, such as bolt 54 and nut 55 (Fig. 8) is a supporting member 56. As can be more clearly seen in Fig. 8, supporting member 56 is adapted to fixedly and adjustably hold a rotatable cutting instrumentality, such as toothed cutter 57, mounted on a rotatable flexible shaft 58 driven from an external source of power (not shown). Cutter 57 is so mounted in member 56 as to be at such an angle to the longitudinal axis of lathe 31 as will be determined by the form of templet 42.

In operating this modification of the invention, cutter 57 is moved longitudinally along the lathe 31 by moving handle 59 attached to bar 53. Cutter 57 is automatically moved toward and away from the turning 46 as governed by the movement of guiding member 47 in following the outline of templet 42 with its finger 51. During this time, turning 46 is stationary because lathe 31 is not continuously driven. Thus, the operation of this modification of the invention is the antithesis of the operation of that form of the invention shown in Fig. 1 because, in Fig. 7, cutter 57 rotates continuously at high speed while the turning 46 rotates slowly by hand whereas, in Fig. 1, the turning 23 is rotated continuously at high speed while the chisel 11 is moved slowly by hand.

When cutter 57 has finished cutting away pieces of turning 46 along that side of turning 46 which faces cutter 57, templet 42 is revolved slightly by manually rotating hand wheel 43 through a portion of its circumference. This movement is transmitted to turning 46 by means of belt 32. The cutting process is then repeated. This rotating and cutting process is alternated until turning 46 has been cut to a form corresponding to the form of templet 42.

An alternative method of shaping is to move gauge member 47 laterally only a single point on templet 42, and then rotating templet 42 and turning 46 slowly. Gauge member 47, bar 53, stirrup 38, and cutter 57 are moved longitudinally a short distance and the process repeated. This procedure is continued until the shaping of turning 46 has been completed.

Thus, it can be seen that, with the modification of the invention shown in Figs. 7, 8, and 9, it is not necessary to use the usual continuously rotating lathe. In fact, it is not necessary to use a lathe, in the sense of ordinary usage, because any convenient rotatable holding means could be used instead if desired.

The above specific embodiments of the invention have been shown and described purely for purposes of illustration. It is to be understood that various changes and modifications of these specific embodiments may be made without departing from the features and principles of operation of the invention. Some of these modifications have been suggested above, but others may suggest themselves to those skilled in the art. Consequently, the scope of the invention is to be limited only by the claims appended hereto.

What is claimed is:

1. In a lathe having a tool rest with a templet secured thereto, said templet having a predetermined outline, an attachment for facilitating the shaping of duplicate turnings, said attachment including a stirrup slidably mounted on the tool rest, a cutting device, a gauge member slidably mounted on the templet, both said stirrup and said gauge member being adapted to receive the cutting device, and an instrumentality slidably connecting the gauge member to the stirrup for supporting the gauge member and for insuring synchronous lateral movement of the stirrup and gauge member while permitting independent outward movement of the gauge member in accordance with the outline of the templet.

2. In a lathe having a tool rest with a templet secured thereto, said templet having a predetermined outline, an attachment for facilitating the shaping of duplicate turnings, said attachment including a stirrup slidably mounted on the tool rest, a cutting device, a gauge member slidably mounted on the templet and having a recess in one edge, both said stirrup and said gauge member being adapted to receive the cutting device, a plurality of rods slidably connecting the gauge member to the stirrup for supporting said gauge member and for insuring synchronous lateral movement of the stirrup and gauge member while permitting independent outward movement of the gauge member in accordance with the outline of the templet, and a roller for reducing the effect of friction upon the engagement of the gauge member with the templet, said roller being rotatably mounted in the recess in the edge of the gauge member.

3. In a lathe adapted to shape duplicate turnings of considerable length, a plurality of tool rests positioned end to end, aligning means for aligning the tool rests, joining means for securely joining the tool rests together, a horizontal templet detachably secured to the tool rests, said templet having a predetermined outline, a stirrup slidably mounted on the tool rests, a chisel having a point, a gauge member mounted on the templet, both said gauge member and said stirrup being adapted to slidably receive the chisel, a rod slidably connecting the gauge member to the stirrup for supporting said gauge member and for insuring synchronous lateral movement of the stirrup and gauge member while permitting independent outward movement of the gauge member in accordance with the outline of the templet, and extensions on the gauge member embracing the templet for preventing unintentional downward movement of the chisel point.

LESTER A. BURTON.